United States Patent

[11] 3,576,371

| [72] | Inventor | Edward M. Ulicki<br>East Patterson, N.J. |
|---|---|---|
| [21] | Appl. No. | 796,696 |
| [22] | Filed | Feb. 5, 1969 |
| [45] | Patented | Apr. 27, 1971 |
| [73] | Assignee | Holobeam, Inc.<br>Paramus, N.J. |

[54] ONE WAY OPTICAL RANGING SYSTEM
8 Claims, 4 Drawing Figs.

[52] U.S. Cl. .................................................. 356/4,
343/112.4, 356/51
[51] Int. Cl. .................................................. G01c 3/00
[50] Field of Search ........................................... 356/4, 5,
51, 82, 96, 97, 28; 343/112.4; 350/3

[56] References Cited
UNITED STATES PATENTS
2,206,036  7/1940  Herson .......................... 343/112.4

| 3,227,033 | 1/1966 | White .......................... | 356/4 |
| 3,437,820 | 4/1969 | Thompson, Jr. et al. ..... | 356/5X |
| 3,446,558 | 5/1969 | Seaton .......................... | 356/28X |

OTHER REFERENCES
R. A. Smith et al., "The Detection and Measurement of Infra-Red Radiation," Clarendon Press, 1957, Oxford, Great Britian, pgs. 436—446.

*Primary Examiner*—Rodney D. Bennett, Jr.
*Assistant Examiner*—Joseph G. Baxter
*Attorney*—Sandoe, Hopgood & Calimafde ABSTRACT: This invention relates to a one way optical range finding system. Optical radiation at two different wavelengths, one of which is substantially unaffected by the atmosphere, is transmitted to a distant object through the atmosphere. The ratios of the received radiation signals at the two wavelengths is used to compensate for the atmospheric effects on the other transmitted wavelength.

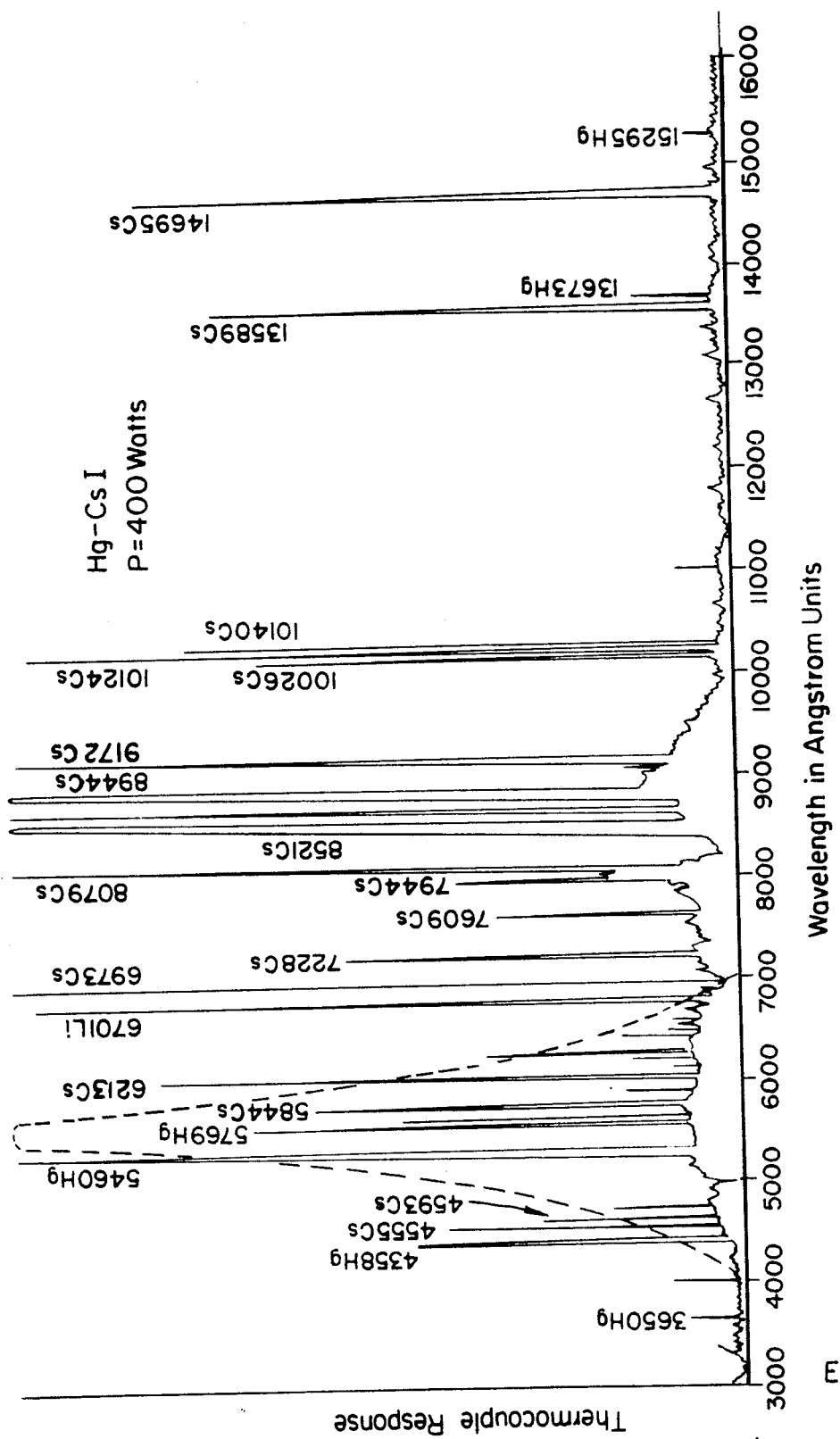

ONE WAY OPTICAL RANGING SYSTEM

This invention relates to a system for measuring distance. More specifically, this system invention relates to a one way ranging system which uses light intensity as a direct indication of distance measured and provides a recognition of various spectral line relationships to compensate for atmospheric absorption and atmospheric attenuation. In a specific embodiment, the invention relates to an airborne, plane collision avoidance system.

The primary object of this invention is to provide an extremely low cost means for distance measurement without requiring a reciprocal reflective target.

A further object of this invention is to provide an optical, one way range finder.

Another object of this invention is to provide a range finder using amplitude attenuation and employing two frequencies.

Still another object of this invention is to provide a dual frequency range finding system in which one of the frequencies is amplitude attenuated with distance and the other signal is amplitude attenuated but not affected by atmosphere.

Yet another object of this invention is to provide an optical range finder using a novel light source having at least two frequencies, one of which sees the atmosphere as a window and is not attenuated thereby.

Yet another object of this invention is to provide a novel light source for range finding purposes.

A still further and another important object of this invention is to provide a one way range finding system for use in aircrafts.

A further object of this invention is to provide a collision avoidance system.

Yet another object is to provide an optical range finding system useful for collision avoidance and utilizing a source also of visual white light.

Briefly, this invention operates by establishing a relationship, at the light source, of output intensity as a function of spectral line identification. At the receiver a correlation is made of the energies received at the spectral lines. The lines received are chosen to optimize transmission through the atmospheric path. The signal received decreases in intensity at the rate of $1/Range^2$. The signal from the auxiliary line provides correction information to the signal which receives atmospheric attenuation or scattering. The receiver utilizes the intensities received at the various wavelengths to correct the signal received for the atmospheric effects.

The above-mentioned and other features and objects of this invention and the manner of attaining them will become more apparent and the invention itself will be best understood by reference to the following description of an embodiment of the invention taken in conjunction with the accompanying drawing, wherein:

FIG. 1a is a diagram illustrating my one-way optical range finding system utilizing a fixed and a moving object;

FIG. 3 is a diagram of the wavelength output from the light source employed.

Figure 1:
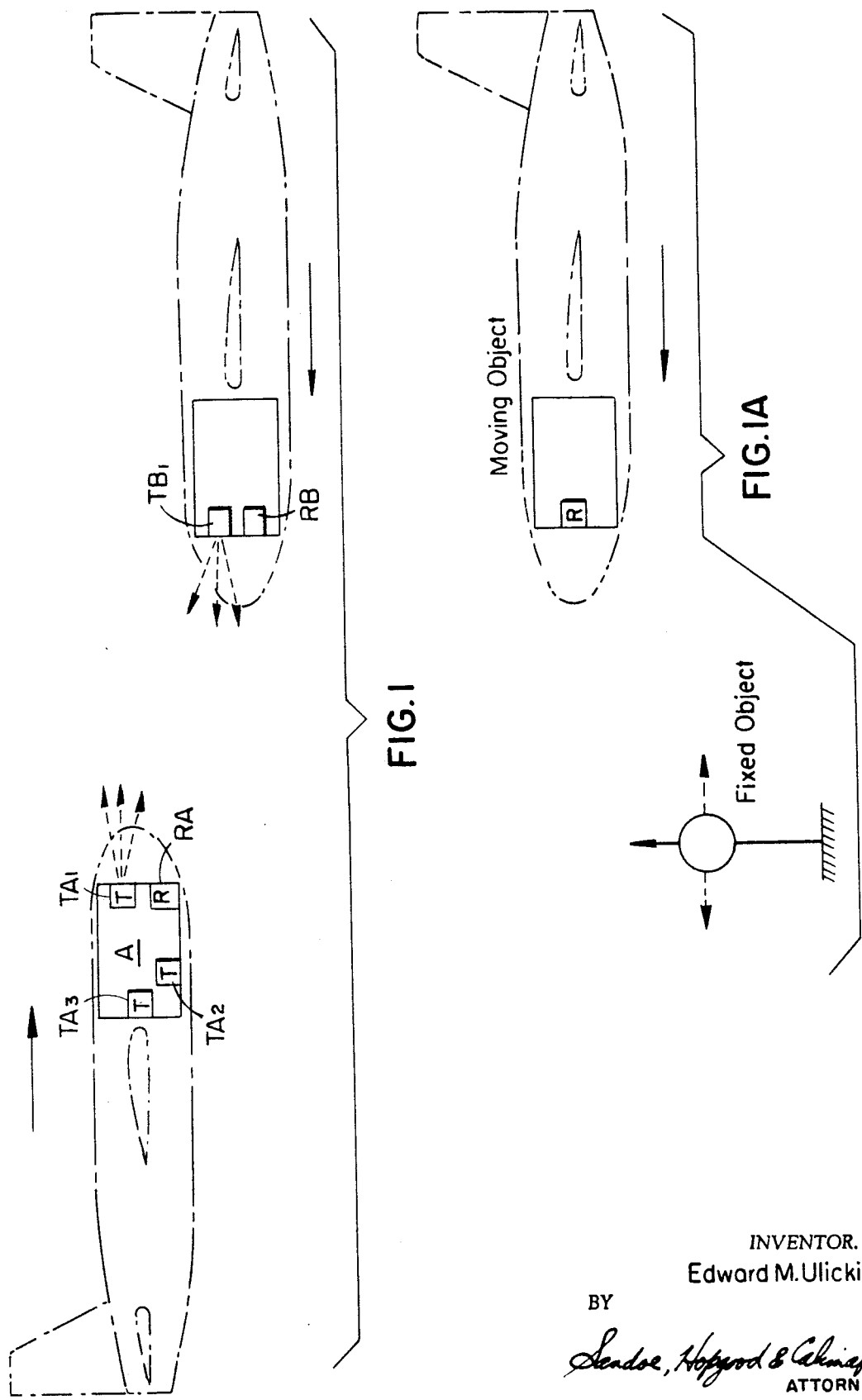
FIG. 1 is a diagram illustrating the movement of two aircrafts each carrying a one-way optical ranging system.

Referring now to FIGS. 1 and 1a, there are shown embodiments of optical range finding system. In FIG. 1 there are shown diagrammatically two moving aircrafts A and B, while in FIG. 1a there are shown a fixed object and a moving object. Since the optical range finding system is intended to determine the distance between objects, it is not necessary for the purposes of this invention that either or both of the objects be moving.

In one of the important aspects of this invention a collision avoidance system is provided. In FIG. 1, there are shown two moving aircrafts A and B, and means are provided to determine the range between such aircrafts. It will be understood that when the range becomes less than a predetermined amount, a signal is produced to inform the aircraft pilots of the small clearance between aircraft. The aircrafts shown are only shown diagrammatically and each utilizes a transmitter and a receiver. In aircraft A, there is shown a transmitter T and in aircraft B, there is shown a receiver R. Each range finding system utilizes respectively a transmitter and a receiver. Since both aircrafts are to have indication of distance, each will respectively use pairs of transmitters and receivers. Referring to aircraft A, there is shown a plurality of transmitters TA1, TA2, and TA3 in order to provide complete coverage in space. In a practical sense, only one transmitter TA1 may be utilized and only one transmitter TB is illustrated for aircraft B. Transmitter TA1 transmits at least two optical frequencies which are received at aircraft B and the receiver RB. When aircraft A is too close to aircraft B, receiver RB will provide a signal to the pilot in aircraft B.

If aircraft B has a transmitter TB and aircraft A has a receiver RA, then when the planes are too close receiver RA will receive a signal to the pilot of aircraft A.

In order to explain the operation of FIG. 1a, a fixed transmitter T is provided transmitting at least two optical frequencies, which are received by the receiver R of the moving object.

The operations of the transmitter and the receiver will now be explained.

Figure 2:
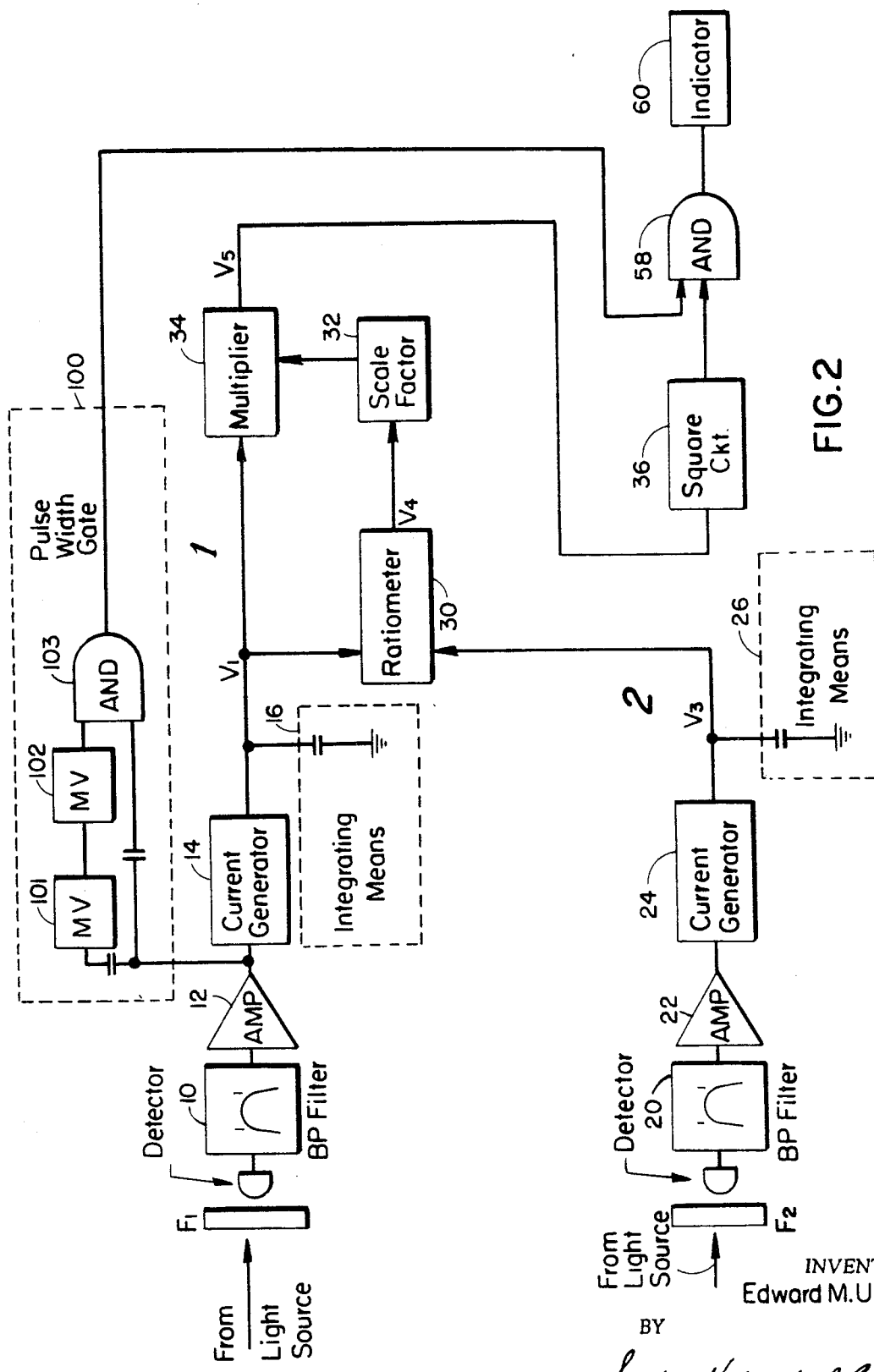
FIG. 2 is a block diagram of my invention.

Referring to FIG. 2, the optical source at frequency $F1$ is received along channel 1 and applied to the inverse square root circuit 36, the output of which is applied to indicator 60. Since the optical signal at frequency $F1$ has been attenuated inversely in accordance with the square of the distance, a simple squaring and inversion computation as provided at 36 provides a first approximation of range. Atmospheric effects are corrected over the channel 2 which receives the signal at frequency F2, that signal being substantially unaffected by atmospheric conditions in the optical transmission path. The signal derived in channel 2 is utilized to supply a correcting signal to multiplier 34. There is also provided a pulse with gate means 100 which applies its output to an AND circuit 58. The operation of channels 1, 2 and the gating means 100 will be explained in more detail.

In the system shown in FIG. 2, an xenon or a mercury doped cesium iodide light source is shown at 1 mounted, for example, in airplane A. The receiver is mounted in airplane B, for example. Two wavelengths $E1$, $F2$ are provided by light source 1, approximately 8550A and 8950A.

At the receiver, the light signals at each wavelength are filtered and amplified in linear amplifiers 12, 22. Light receiving means in the form of a band-pass filter 10 preceding amplifier 12 is selectively frequency responsive at frequency $F1$, and light receiving means in the form of a band-pass filter 20 preceding an amplifier 22 is selectively frequency responsive at frequency $E2$. At each amplifier output, there is an integrating means 16, 26 which integrates the pulse input energy over the duration of the pulse. This information is stored in integrating capacitors illustratively used for 16, 26, as voltages $V1$, $V2$. The two voltages are then compared in ratiometer 30, which performs the operation $V1/V2$. To accomplish the division operation, standard analog integrated circuits can be used. The output signal $V4$ from the ratiometer 30 is applied to a scale factor circuit 32. The output of circuit 32 is applied to a multiplier 34 to produce the range signal $V5$ corrected to compensate for atmospheric effects.

Range of the source from the detector is normally proportional to the square root of the inverse intensity received.

$$\left(R = \sqrt{\frac{1}{intensity}}\right)$$

Therefore, if there were no atmospheric effects, the range signal is determined by utilizing standard computing elements which operate upon the signal representing the intensity of the light signal, forming the inverse, and then taking the square root of this value.

The range measurement for the attenuation due to path must be corrected as will now be described. These wavelengths have been selected to provide the optimum in atmospheric transmission and atmospheric transmission correction. The signal at 8950A is in an atmospheric window. This means that there is a relatively small effect on the amplitude of the signal caused by the atmospheric effects of the path. Although this effect is small, it is not negligible. The signal at 8550A has been selected to correct the 8950A signal. At 8550A there is a marked effect due to atmospheric absorption and atmospheric scattering. Therefore, by determining the ratio of the 8550A to the 8950A signal at the receiver and knowing the predetermined, fixed ratio at the transmitter, means utilizes the ratio of the signals received at the two wavelengths to compensate the 8950A signal for the path effect. The ratio of 8950A to 8550A energy is a physical constant and fixed by the particular lamp that is used. Therefore, once it is measured at the receiver, the computation for ratio correction can be performed by conventional computing equipment.

In the specific and exemplary embodiment, the ratiometer output $V4$ operates to perform the atmospheric correction by means of a scale factor correction to a multiplier. The scale factor correction is implemented by using nonlinear break points in the feedback of an operational amplifier. This technique is a standard method of synthesizing nonlinear functions. The output of the multiplier 34 passes through an inverse square root circuit 36 which is used to restore the intensity to the desired value for range.

Pulse width gating means 100 coupled to the output of amplifier 12 is provided in a parallel path into the range output and produces a gating signal from the input. Gating means 100 includes first and second series-connected multivibrators 101 and 102, the latter being connected to one input of AND gate 103. The other input of gate 103 is obtained from the output of amplifier 12. The output of gate 103 is coupled to the other input of AND gate 58. This pulse input to gate 58 aids in noise discrimination, by sensing when a true range signal is at the input amplifier. This is accomplished by providing a certain pulse width on the transmitter and identifying that the same pulse width is present on the receiver. Pulses of shorter or longer duration are attributable to noise. The output of the system is range directly.

In an aspect of my invention, I have devised a lamp configuration for each preferred application of this range system to produce the two desired frequencies. Referring to FIG. 3, a special purpose lamp is shown for an airborne collision avoidance system. The lamp proposed is a spectral line source in the near infrared. It has peak resonance at approximately 8550A and 8950A. The bandwidth of these resonances can be accurately controlled. The lamp also has an output in the visible region because of the mercury. This provides a visual indication of the target as well as the range information.

This special lamp is meant to serve a dual purpose. First, to provide a source of high intensity infrared radiation in the region of detector sensitivity. The cesium resonance lines at 8521A and 8934A with line widths of 50A to 100A should radiate at least 5 percent of the electrical input. Thus, for a design of 100 joules at a pulse width of 100 microseconds, 50 kw. will be radiated in this narrow infrared region. A second purpose is to provide a visual source of white light. FIG. 3 indicates the actual white characteristics of the lamp. As seen in the FIG., the mercury lines covering the wavelength range of 4000A to 6500A provide excellent photopic and scotopic coverage. This results in an excess of 75 kw. to be radiated in the visible.

The specific lamp comprises mercury as a carrier. The lamp configuration is conventional and employs an envelope, a cathode, and an anode. The envelope is filled with the vapor as described herein. To this, there are several additives added in the form of iodide salts. In the arc core the iodide molecule dissociates, producing metal atoms and iodide atoms. The metal takes part in the arc discharge processes, producing special enhancement of the arc radiation, while the iodide atoms are in the main excluded from the arc process. In the cooler regions of the discharge near the walls the metal atom is still combined as an iodide molecule, thus reducing the possibility of a metal atomic vapor, causing self-absorption of the metal atomic radiation originating in the arc core. Finally, the iodide atoms, which are from the dissociation in the plasma combined with the evaporated tungsten from the electrodes to form volatile tungsten hexoiodide, which condenses on the hot electrodes only to dissociate leaving behind the tungsten and recycling the iodide to begin the cycle again. This hexoiodide cycle prevents darkening of the transparent envelope of the arc source.

In addition, it is desired that the device be low cost, small size, and low power consumption. The lamp represents a power drain of between 66 and 100 watts, depending upon whether the pulse repetition time is 1½ or 1 second. The lamp will be compact occupying slightly over 2 cubic inches. The device will be of all quartz construction resulting in low cost. Other lamp sources, while less desirable, may also be used; for example, a standard xenon flash lamp can be used, however, the system range is decreased for the same input power to the lamp.

While the foregoing description sets forth the principles of the invention in connection with specific apparatus, it is to be understood that this description is made only by way of example and not as a limitation of the scope of the invention.

I claim:

1. A method for determining distance comprising the steps of: transmitting radiation signals of known intensities through the atmosphere at two different frequencies, one of said frequencies being substantially unaffected by atmosphere; receiving the signals and separating the signals into first and second received signals, determining range by detecting the attenuation of the first received signal, and utilizing the second received signal from the atmospherically unaffected signal to provide a correction factor for said first signal.

2. A system for avoiding collision between first and second airplanes, said system comprising a transmitter in said first airplane; a receiver in said second airplane; said transmitter comprising a light source transmitting at least two different frequencies, one of which is optically transparent to the atmosphere, both of said signals being attenuated in accordance with distance between the airplanes, said receiver comprising means to determine the distance of said two aircrafts by utilizing the ratio of the received signals.

3. An optical range measuring system comprising means for transmitting radiation of precisely controlled intensities at first and second different optical wavelengths to a distant object through an atmospheric path, one of said wavelengths being substantially unaffected by atmospheric conditions, means for receiving reflected radiation from said object, said receiving means including means for separating the received radiation into first and second signals at said different wavelengths, and means for sensing the relative intensities of said received signals and for producing a correction signal compensating for the atmospheric effects on the other of said wavelengths.

4. The system of claim 3, in which said correction signal producing means comprises means for sensing the ratio of said first and second received signals, and further comprising means for multiplying one of said received signals by said correction signal.

5. The system of claim 4, further comprising a squaring circuit coupled to the output of said multiplier and a range indicator coupled to the output of said squaring circuit.

6. The system of claim 5, further comprising means for producing a gating signal in response to said one of said received signals, and gating means interposed between said squaring circuit and said indicator and coupled to said gating signal producing means.

7. The invention of claim 3 in which the two frequencies are approximately 8550A and 8950A.

8. The lamp of claim 3 in which the light source is a mercury doped cesium iodide light source.